United States Patent
Kotha et al.

(10) Patent No.: US 10,084,903 B2
(45) Date of Patent: Sep. 25, 2018

(54) METHOD AND SYSTEM FOR ESTABLISHING A COMMUNICATION CHANNEL BETWEEN COMPUTING DEVICES IN A CUSTOMER CARE ENVIRONMENT

(71) Applicant: Conduent Business Services, LLC, Dallas, TX (US)

(72) Inventors: Surya Prakash Kotha, Chennai (IN); Ramesh Nagarajan, Pittsford, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 126 days.

(21) Appl. No.: 15/203,875

(22) Filed: Jul. 7, 2016

(65) Prior Publication Data
US 2018/0013874 A1  Jan. 11, 2018

(51) Int. Cl.
| | |
|---|---|
| H04M 3/00 | (2006.01) |
| H04M 1/725 | (2006.01) |
| G06Q 30/00 | (2012.01) |
| G06Q 10/06 | (2012.01) |
| H04M 3/51 | (2006.01) |
| H04M 3/523 | (2006.01) |

(52) U.S. Cl.
CPC .... *H04M 1/72522* (2013.01); *G06Q 10/0633* (2013.01); *G06Q 30/016* (2013.01); *H04M 3/5166* (2013.01); *H04M 3/5183* (2013.01); *H04M 3/523* (2013.01); *H04M 2201/18* (2013.01)

(58) Field of Classification Search
CPC ................................. H04M 1/72522
USPC ....... 379/265.01–265.14, 266.01–266.1, 309
See application file for complete search history.

(56) References Cited

U.S. PATENT DOCUMENTS

| | | | |
|---|---|---|---|
| 7,071,921 B2 * | 7/2006 | Hsu ..................... | G06F 3/03543 345/161 |
| 7,676,221 B2 | 3/2010 | Roundtree et al. | |

(Continued)

FOREIGN PATENT DOCUMENTS

WO   2015181776 A1   12/2015

OTHER PUBLICATIONS

GB Search Report, dated Dec. 13, 2017, in related application No. GB1710619.6.

*Primary Examiner* — William Deane, Jr.
(74) *Attorney, Agent, or Firm* — Jones Robb, PLLC

(57) ABSTRACT

The disclosed embodiments illustrate method and system for establishing a communication channel between computing devices in a customer care environment. The method includes receiving a first input from a customer-computing device associated with the customer. The received first input is compared with one or more pre-stored datasets. Based on the comparison, a plurality of options corresponding to each of a plurality of levels of one or more workflows is rendered on a user interface displayed on a display screen of the customer-computing device. A second input is received for one of the rendered plurality of options. The second input is representative of at least a preference of the customer for a service associated with a workflow. Based on at least the received second input, a communication channel is established between the customer-computing device and an agent-computing device associated with the customer care agent.

15 Claims, 9 Drawing Sheets

(56) References Cited

U.S. PATENT DOCUMENTS

| | | | |
|---|---|---|---|
| 8,325,642 B1* | 12/2012 | McHenry | H04W 4/12 |
| | | | 370/310 |
| 8,345,835 B1* | 1/2013 | Or-Bach | G06Q 30/0269 |
| | | | 379/114.13 |
| 9,135,638 B2* | 9/2015 | Stone | H04M 3/42068 |
| 2003/0093495 A1* | 5/2003 | McNulty | H04L 29/06 |
| | | | 709/217 |
| 2007/0280445 A1* | 12/2007 | Shkedi | H04L 12/66 |
| | | | 379/93.23 |
| 2008/0071745 A1* | 3/2008 | Clarke | H04M 7/003 |
| 2008/0082980 A1* | 4/2008 | Nessland | G06Q 10/02 |
| | | | 718/104 |
| 2008/0112558 A1* | 5/2008 | Mendiola | H04M 3/42008 |
| | | | 379/265.09 |
| 2013/0031208 A1* | 1/2013 | Linton | G09B 7/02 |
| | | | 709/217 |
| 2013/0054684 A1* | 2/2013 | Brazier | G06Q 10/02 |
| | | | 709/203 |
| 2013/0130661 A1 | 5/2013 | Berner et al. | |
| 2014/0067455 A1* | 3/2014 | Zhang | G06Q 10/109 |
| | | | 705/7.24 |
| 2014/0126707 A1 | 5/2014 | Patel | |
| 2014/0129457 A1* | 5/2014 | Peeler | G06Q 10/067 |
| | | | 705/317 |
| 2014/0164341 A1* | 6/2014 | Baratta | G06F 17/30867 |
| | | | 707/706 |
| 2016/0081684 A1* | 3/2016 | Nunley | A61B 17/025 |
| | | | 600/215 |
| 2016/0139998 A1* | 5/2016 | Dunn | G06F 11/1451 |
| | | | 707/640 |
| 2016/0232546 A1* | 8/2016 | Ranft | G06Q 30/0206 |
| 2017/0251326 A1* | 8/2017 | Ngo | H04W 4/14 |

\* cited by examiner

METHOD AND SYSTEM FOR ESTABLISHING A COMMUNICATION CHANNEL BETWEEN COMPUTING DEVICES IN A CUSTOMER CARE ENVIRONMENT

TECHNICAL FIELD

The presently disclosed embodiments are related, in general, to a customer care environment. More particularly, the presently disclosed embodiments are related to method and system for establishing a communication channel between computing devices in a customer care environment.

BACKGROUND

Past decade has witnessed various advancements in the field of customer service and support (CSS) for retaining and extending customer relationships once a product or service is sold. One of the various components of the CSS corresponds to customer care helpdesks that may cater to various queries, requests, and complaints related to the products and/or services, over various communication channels, such as phone, chats, social networks, and emails.

Generally, when a user calls a customer care helpdesk of an entity, the user is connected to an interactive voice response system (IVRS). The user may have to listen to various options provided by the IVRS and select a required option. In certain instances, if there are multiple options available in the IVRS, the user might forget the option that was desired to be selected. The user may have to again listen to and wait for the various options thereby negatively impacting the customer satisfaction. Further, long waiting time at the user side, and in-turn reduced number of calls attended per hour at the entity side, may increase overall cost for the calls attended by the entity. Thus, a simplified and efficient technique may be desirable to overcome such problems faced by the user and customer care helpdesk of an entity.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for establishing a communication channel between computing devices in a customer care environment. The method includes receiving, by one or more transceivers at a computing server, a first input from a customer-computing device associated with the customer over a communication network. The first input from the customer-computing device corresponds to numerical data. The method further includes comparing, by one or more comparators at the computing server, the received first input with one or more pre-stored datasets. The one or more pre-stored datasets include at least a plurality of contact numbers associated with plurality of entities. Further each of the plurality of contact numbers is associated with one or more workflows. The method further includes rendering, by one or more processors at the computing server, a plurality of options corresponding to each of a plurality of levels of the one or more workflows, on a user interface displayed on a display screen of the customer-computing device, based on the comparison. The method further includes receiving, by the one or more transceivers at the computing server, a second input for one of the rendered plurality of options corresponding to each of the plurality of levels of the one or more workflows, from the customer-computing device over the communication network, wherein the received second input is representative of at least a preference of the customer for a service of one or more services associated with a workflow of the one or more workflows. The method further includes establishing, by the one or more processors at the computing server, the communication channel between the customer-computing device and an agent-computing device associated with the customer care agent over the communication network, based on at least the received input.

According to embodiments illustrated herein, there is provided a system for establishing a communication channel between computing devices in a customer care environment. The system includes one or more processors configured to receive a first input from a customer-computing device associated with the customer over a communication network. The first input from the customer-computing device corresponds to numerical data. The one or more processors are further configured to compare the received first input with one or more pre-stored datasets. The one or more pre-stored datasets include at least a plurality of contact numbers associated with plurality of entities. Further each of the plurality of contact numbers is associated with one or more workflows. The one or more processors are further configured to render a plurality of options corresponding to each of a plurality of levels of the one or more workflows, on a user interface displayed on a display screen of the customer-computing device, based on the comparison. The one or more processors are further configured to receive a second input for one of the rendered plurality of options corresponding to each of the plurality of levels of the one or more workflows, from the customer-computing device over the communication network, wherein the received second input is representative of at least a preference of the customer for a service of one or more services associated with a workflow of the one or more workflows. The one or more processors are further configured to establish the communication channel between the customer-computing device and an agent-computing device associated with the customer care agent over the communication network, based on at least the received input.

According to embodiment illustrated herein, there is provided a computer program product for use with a computer. The computer program product includes a non-transitory computer readable medium. The non-transitory computer readable medium stores a computer program code for establishing a communication channel between computing devices in a customer care environment. The computer program code is executable by one or more processors to receive a first input from a customer-computing device associated with the customer over a communication network. The first input from the customer-computing device corresponds to numerical data. The computer program code is further executable by one or more processors to compare the received first input with one or more pre-stored datasets. The one or more pre-stored datasets include at least a plurality of contact numbers associated with plurality of entities. Further each of the plurality of contact numbers is associated with one or more workflows. The computer program code is further executable by one or more processors to render a plurality of options corresponding to each of a plurality of levels of the one or more workflows, on a user interface displayed on a display screen of the customer-computing device, based on the comparison. The computer program code is further executable by one or more processors to receive a second input for one of the rendered plurality of options corresponding to each of the plurality of levels of the one or more workflows, from the customer-computing device over the communication network, wherein the received second input is representative of at least a preference of the customer for a service of one or more services associated with a workflow of the one or more workflows. The computer program code is further executable by one or more processors to establish the communication channel between the customer-computing device and an agent-computing device associated with the customer care agent over the communication network, based on at least the received input.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
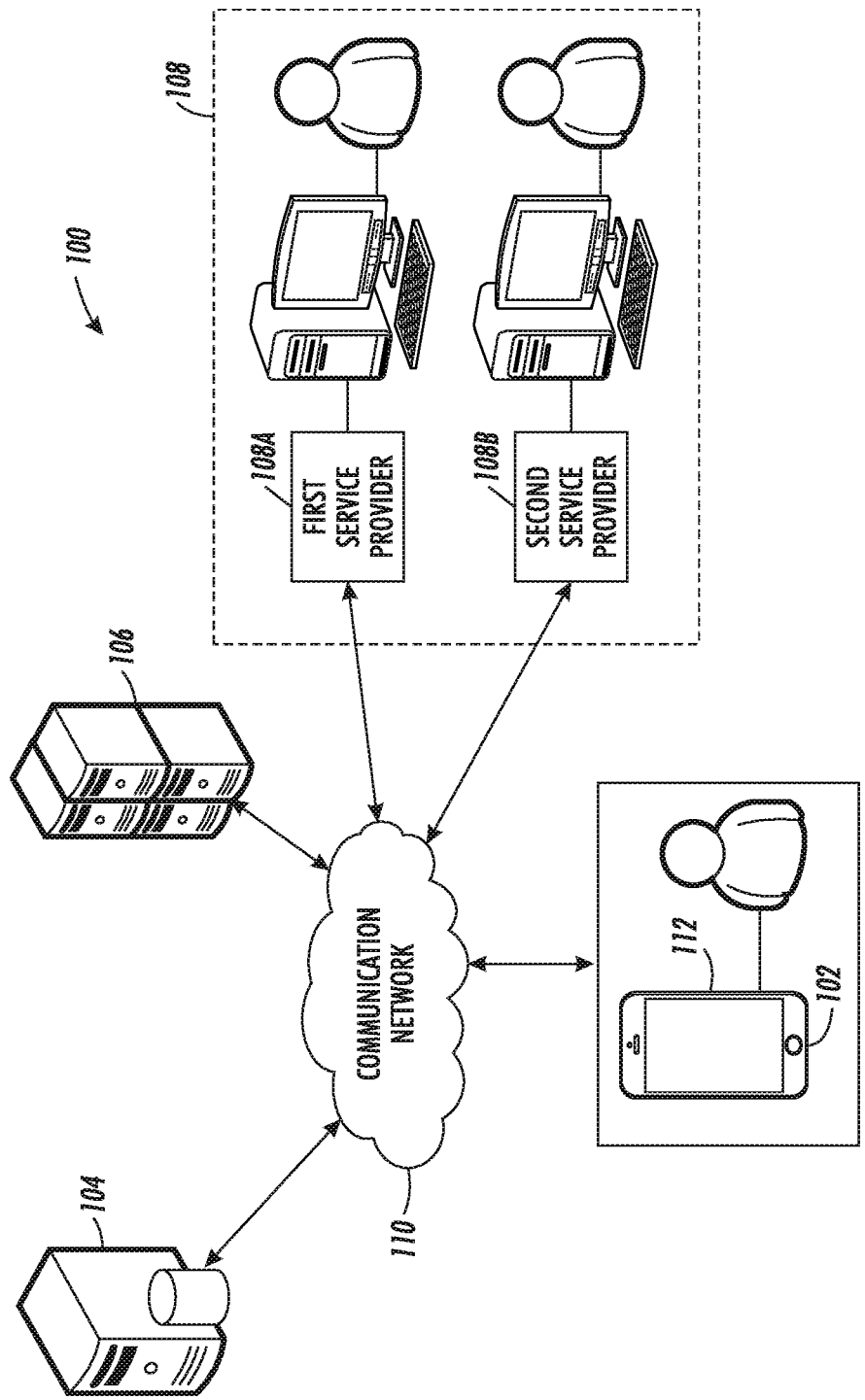
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "customer-computing device" refers to a computer, a device (that includes one or more processors/microcontrollers and/or other such electronic components), or a system (that performs one or more associated operations according to one or more sets of instructions, codes, programs, and/or the like). In an embodiment, a customer may utilize the customer-computing device to communicate with an agent associated with an agent-computing device in a customer care environment, over a communication network. Examples of the customer-computing device includes, but are not limited to, a desktop computer, a laptop, a personal digital assistant (PDA), a mobile device, a smartphone, and a tablet computer (e.g., iPad® and Samsung Galaxy Tab®).

An "agent-computing device" refers to a computer, a device (that includes one or more processors/microcontrollers and/or other such electronic components), or a system (that performs one or more associated operations according to one or more sets of instructions, codes, programs, and/or the like). In an embodiment, an agent may utilize the agent-computing device to communicate with the customer-computing device associated with the customer, over a communication network. Examples of the agent-computing device includes, but are not limited to, a desktop, a laptop, a personal digital assistant (PDA), and a smartphone.

A "computing-server" refers to a computer, a device, or a system that includes one or more processors/microcontrollers and/or other such electronic components, which provide services to other devices, such as customer-computing device associated with a customer. In an embodiment, the computing-server may correspond to an application server that may be configured to perform registration of service providers associated with customer care centres of various entities. The application server may be configured to provide a dataset to the customer computing device over the communication network. Examples of the computing-server include, but are not limited to, a web server, a real-time communication server, a collaboration server, a list server, a telnet server, an open source server, and/or a virtual server.

"One or more workflows" refer to a sequence of levels that are traversed to provide one or more services. The one or more workflows are registered as a dataset for a contact number of a customer care helpdesk. Each of the one or more workflows comprises a plurality of levels. For example, a workflow of a banking company may be traversed to provide a service, such as fixed deposit account information, to the customer. The workflow may be represented as "Select Language→English→Investment→FDs→Account Information." The plurality of levels may correspond to "Select Language," "English," "Investment," "FDs," and "Account Information." The plurality of levels is traversed by the customer to receive a service that corresponds to the final level "Account Information."

"One or more services" refer to a specific set of services provided to the customer by an entity over the communication network. For example, one or more services provided by a banking company, may include, but not limited to, providing account information and complaint of a savings account, providing account information and complaint of a current account, providing account information and complaint of a loan, facilitating in selling and buying of shares, investing in fixed deposits, and/or investing in mutual funds.

"Plurality of options" is represented by graphical items, rendered on the user interface of a customer-computing device. The plurality of options, corresponding to each of a plurality of levels of one or more workflows, is rendered in a sequence defined by an entity. One or more options, corresponding to a level of the one or more workflows, are rendered based on selection of previous one or more options corresponding to a previous level of the one or more workflows. For example, at the Level "0," one option "Select Language" is rendered on the user interface. Once selected, at the Level "1," next five options "English," French," "Spanish," and "Russian" are rendered on the user interface. Once the option "English" is selected at the Level "2," next two options "Banking" and "Investment" are rendered on the user interface.

A "first input" refers to numerical data provided by the customer at the customer-computing device to connect to a customer care helpdesk, over the communication network. For example, the first input corresponds to a contact number, such as "18001234567," that the customer may dial to connect with the customer care helpdesk of a banking company.

A "second input" refers to a preference of a customer for one of one or more services associated with corresponding workflow of one or more workflows. The second input is provided by the customer via a customer-computing device for one of the rendered plurality of options corresponding to each of a plurality of levels of the one or more workflows.

A "communication channel" refers to a communication medium that is established between a customer-computing device and an agent-computing device over a communication network. Over the communication channel, one or more services may be provided by the agent-computing device to the customer-computing device.

FIG. 1 is a block diagram of a system environment 100 in which various embodiments may be implemented. The system environment 100 includes a customer-computing device 102, a database 104, an application server 106, a plurality of service providers 108 (such as a first service provider 108A and a second service provider 108B), and a communication network 110. The customer-computing device 102, that includes a display screen 112, may be associated with a customer. The customer-computing device 102, the database 104, the application server 106, and the plurality of service providers 108 are communicatively coupled with each other, via the communication network 110.

FIG. 1 shows, for simplicity, one customer-computing device, such as the customer-computing device 102, one database server, such as the database 104, one application server, such as the application server 106, and two service providers, such as the first service provider 108A and the second service provider 108B. However, it will be apparent to a person having ordinary skill in the art that the disclosed embodiments may also be implemented using multiple customer-computing devices, multiple database servers, multiple application servers, and multiple service providers, without departing from the scope of the disclosure. Further, the scope of the disclosure is not limited to realizing the application server 106 and the customer-computing device 102 as separate entities. In an embodiment, the functionalities of the application server 106 may be implemented within the customer-computing device 102.

The customer-computing device 102 refers to a computing device used by a customer. The customer-computing device 102 may include one or more processors in communication with one or more memory units. The one or more memory units may include one or more sets of computer readable codes, instructions, programs, and/or the like that are executable by the one or more processors to perform one or more pre-specified operations. In an embodiment, one or more applications, such as a dialer application, may be installed at the customer-computing device 102. Once the customer provides a first input, such one or more applications may be configured to search a local repository to confirm the validity of the first input. The one or more applications may identify that the first input corresponds to a contact number of a customer care helpdesk of an entity associated with a service provider, such as the first service provider 108A.

Based on the first input, the customer-computing device 102 may be further configured to receive a dataset, such as a tree structure that includes one or more workflows, from the application server 106 over the communication network 110. The one or more workflows correspond to the one or more services that may be provided by the customer care helpdesk of the entity associated with the first service provider 108A. The customer-computing device 102 may be further configured to store the received one or more workflows in the local memory. The customer-computing device 102 may be further configured to connect with the IVRS of the customer care helpdesk of the entity associated with the first service provider 108A. Based on the retrieval of the one or more workflows from the local memory, the customer-computing device 102 may be configured to render a plurality of options corresponding to each level of a plurality of levels of the one or more workflows. The customer-computing device 102 may be further configured to receive a second input for one of the rendered plurality of options corresponding to each of the plurality of levels of the one or more workflows. Accordingly, a communication channel may be established between the customer-computing device 102 and an agent-computing device (not shown) of the customer care helpdesk of an entity associated with the first service provider 108A.

The customer-computing device 102 may be further configured to render the desired service, such as account information, displayed on a portion of the display screen 112 of the customer-computing device 102. The desired service may be rendered based on the second input for an option corresponding to the desired service. In an embodiment, the customer-computing device 102 may be further configured to render a selected multimedia content item on the user interface displayed on a portion of the display screen 112 of the customer-computing device 102. Examples of the customer-computing device 102 may include, but are not limited to, a personal computer, a laptop, a smartphone, a personal digital assistant (PDA), a mobile device, a tablet, or other such computing devices.

The database 104 may refer to a computing device or a storage device that may be configured to perform one or more database operations. The one or more database operations may include one or more of, but are not limited to, receiving one or more queries, data, or content from one or more computing devices, processing and storing the received one or more queries, data, or content, and transmitting the one or more queries, data, or content to one or more computing devices. For example, the database 104 may be configured to store one or more sets of data. The one or more sets of data, pre-stored in the database 104, includes at least a plurality of contact numbers, such as customer care helpdesk numbers, of a plurality of entities. The plurality of entities may be associated with the plurality of service providers 108, such as the first service provider 108A and the second service provider 108B.

The plurality of contact numbers of the plurality of entities and the corresponding one or more workflows may be stored in the database 104 in accordance with various data items, such as a tree structure. The database 104 may receive the one or more workflows provided by the plurality of entities at the time of registration of the plurality of entities with the application server 106. The database 104 may receive the one or more workflows from the plurality of entities over the communication network 110. Thereafter, the database 104 communicates with the application server 106 when the first input is provided by the customer via the customer-computing device 102. In an embodiment, the database 104 communicates with the application server 106 using one or more protocols, such as, but not limited to, Open Database Connectivity (ODBC) protocol and Java Database Connectivity (JDBC) protocol. In an embodiment, the database 104 may be hosted in a cloud.

Further in an embodiment, the database 104 may store one or more sets of instructions, codes, scripts, or programs that may be retrieved by the application server 106 to perform one or more operations. For querying the database 104, one or more querying languages may be utilized, such as, but not limited to, SQL, QUEL, and DMX. In an embodiment, the database 104 may be realized through various technologies such as, but not limited to, Microsoft® SQL Server, Oracle®, IBM DB2®, Microsoft Access®, PostgreSQL®, MySQL® and SQLite®.

A person with ordinary skill in the art will understand that the scope of the disclosure is not limited to the database 104 as a separate entity. In an embodiment, the functionalities of the database 104 may be integrated into the application server 106, and vice versa, without deviating from the scope of the invention.

The application server 106 may refer to a computing device or a software framework hosting a web-based application or a software service. In an embodiment, the application server 106 may be implemented to execute procedures such as, but not limited to, the one or more sets of programs, instructions, codes, routines, or scripts stored in one or more memory units for supporting the hosted application or the software service.

In an embodiment, the hosted web-based application or the software service may be configured to perform the one or more pre-specified operations. Examples of the one or more pre-specified operations may include registration of the plurality of service providers 108 based on contact numbers of the customer care helpdesks of various entities, receiving the one or more workflows from each of the registered plurality of service providers 108, and storing the plurality of contact numbers and the one or more workflows received from each of the registered plurality of service providers 108 in the database 104. Examples of the one or more pre-specified operations may include receiving the first input from the customer-computing device 102, comparing the received first input with one or more pre-stored datasets in the database 104, retrieving the one or more workflows that correspond to the received first input from the database 104, and connecting the customer-computing device 102 with the IVRS of the customer care helpdesk of the entity associated with the first service provider 108A. Examples of the one or more pre-specified operations may include rendering the plurality of options corresponding to each level of the plurality of levels of the one or more workflows, receiving a second input for one of the rendered plurality of options corresponding to each of the plurality of levels of the one or more workflows, and establishing the communication channel between the customer-computing device 102 and the agent-computing device (not shown) of the customer care helpdesk of the entity associated with the first service provider 108A.

In an embodiment, the hosted web-based application or the software service may be configured to receive periodic or aperiodic instructions from the plurality of service providers 108 to update the corresponding tree structures. The hosted web-based application or the software service may be configured to provide instructions to the database 104 to update the tree structures. Such updates may be region-based or time-based defined by the plurality of service providers 108. The application server 106 is realized through various types of application servers such as, but not limited to, a Java application server, a .NET framework application server, a Base4 application server, a PHP framework application server, or any other application server framework.

A person having ordinary skill in the art will appreciate that the scope of the disclosure is not limited to realizing the application server 106 and the customer-computing device 102, as separate entities. In an embodiment, the application server 106 may be realized as an application program installed on and/or running on the customer-computing device 102, without departing from the scope of the disclosure.

The plurality of service providers 108, such as the first service provider 108A and the second service provider 108B, may correspond to a third party or outsourced suppliers that may provide various services to entities. Examples of the plurality of service providers 108 may include including telecommunications service providers (TSPs), application service providers (ASPs), storage service providers (SSPs), and Internet service providers (ISPs). Such services may be associated with customer care helpdesks of various entities that provide one more services, such as consulting services, legal services, telecommunication services, education services, storage services, processing services, banking services, application services, internet services, and/or other such services, to customers. The first service provider 108A may be associated with a first agent-computing device. The first agent computing device may be associated with a first agent. The second service provider 108B may be associated with a second agent-computing device. The second agent-computing device may be associated with a second agent.

The communication network 110 may correspond to a communication medium through which the customer-computing device 102, the database 104, the application server 106, and the plurality of service providers 108 may communicate with each other. Such a communication is performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), Light Fidelity (Li-Fi), ZigBee, EDGE, infrared (IR), IEEE 802.11, 802.16, 2G, 3G, 4G cellular communication protocols, and/or Bluetooth (BT) communication protocols. The communication network 110 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
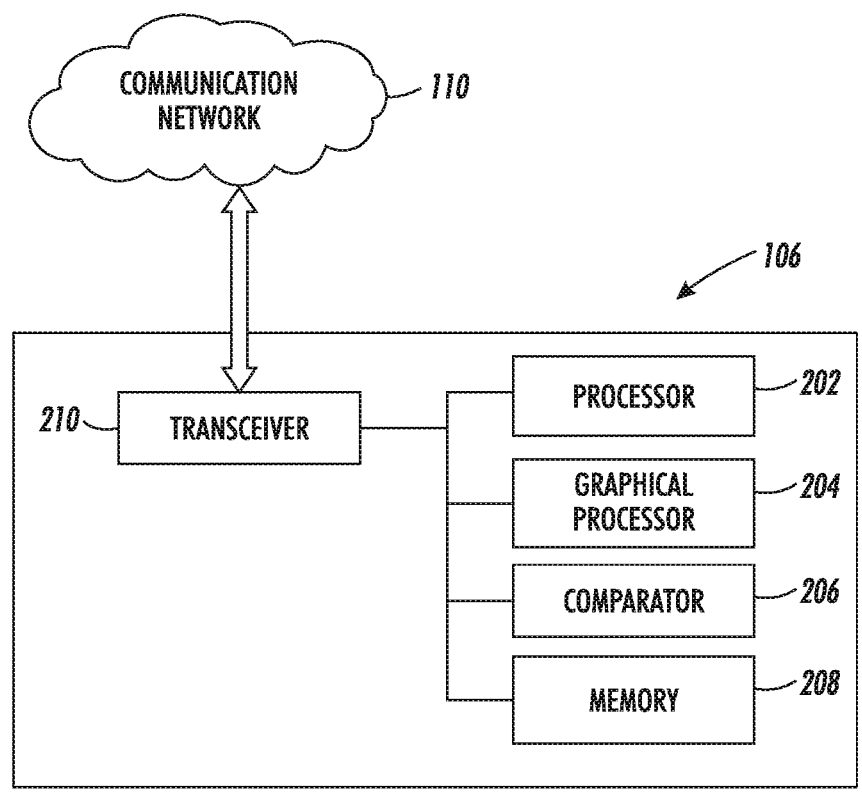
FIG. 2 is a block diagram that illustrates a system for establishing a communication channel between computing devices in a customer care environment, in accordance with at least one embodiment.

FIG. 2 is a block diagram of a system for establishing a communication channel between computing devices in a customer care environment, in accordance with at least one embodiment. FIG. 2 is explained in conjunction with the elements from FIG. 1. In accordance with the foregoing embodiment, the block diagram is shown to be implemented in the application server 106. However, it should not be construed to limit the scope of the disclosure as in another embodiment, the block diagram may be implemented in the customer-computing device 102 also, without any deviation from the scope of the disclosure. With reference to FIG. 2, the block diagram includes one or more processors, such as a processor 202, one or more graphical processors, such as a graphical processor 204, one or more comparators, such as a comparator 206, one or more memory units, such as a memory 208, and one or more transceivers, such as a transceiver 210. The processor 202, the graphical processor 204, the comparator 206, the memory 208, and the transceiver 210 may be communicatively coupled with each other.

The processor 202 comprises suitable logic, circuitries, interfaces, and/or codes that may be configured to execute one or more set of instructions, programs, or algorithms stored in the memory 208 to perform one or more operations. In an embodiment, the processor 202 may be configured to perform registration of the plurality of service providers 108 associated with the customer care helpdesks of the plurality of entities. For example, the processor 202, via a hosted web-based application or the software service, may communicate with the first service provider 108A and the second service provider 108B over the communication network 110. The first service provider 108A and the second service provider 108B may provide the corresponding contact numbers to the processor 202, via the hosted web-based application or the software service, for registration. Such contact numbers should be supported by the IVRSs of the customer care helpdesks of the plurality of entities.

In an embodiment, the processor 202 may be further configured to receive the one or more workflows from each of the registered plurality of service providers 108 associated with the customer care helpdesks of the plurality of entities. Such one or more workflows received from each of the registered plurality of service providers 108 should be supported by the IVRSs of the customer care helpdesks of the plurality of entities.

In an embodiment, the processor 202 may be further configured to store the plurality of contact numbers and the one or more workflows received from each of the registered plurality of service providers 108 in the database 104. The processor 202 may be further configured to receive the first input from the customer-computing device 102 over the communication network 110. The first input may correspond to numerical data, such as contact number of a customer care helpdesk of an entity associated with the registered service provider, such as the first service provider 108A.

In an embodiment, the processor 202 may be further configured to retrieve the one or more workflows that correspond to the received first input from the database 104. The one or more workflows may be retrieved from a data item, such as a tree structure, that corresponds to the contact number of a customer care helpdesk of an entity associated with a registered service provider, such as the first service provider 108A. In an embodiment, when the application server 106 is a separate entity, processor 202 may transmit the retrieved one or more workflows to the customer-computing device 102 over the communication network 110. In such a case, the customer-computing device 102 receives the one or more workflows from the application server 106, and store the received one or more workflows in the local memory. In an embodiment, when the functionality of the application server 106 is implemented in the customer-computing device 102, the retrieved one or more workflows are directly stored in the local memory.

In an embodiment, the processor 202 may be further configured to connect the customer-computing device 102 with the IVRS of the customer care helpdesk of an entity associated with the first service provider 108A. The processor 202 may be further configured to receive a second input for one of the rendered plurality of options corresponding to each of the plurality of levels of the one or more workflows. The second input may be received from the customer-computing device 102 over the communication network 110. The received second input may be representative of at least a preference of the customer for a service of the one or more services associated with a workflow of the one or more workflows.

In an embodiment, the processor 202 may be further configured to establish the communication channel between the customer-computing device 102 and the agent-computing device (not shown). The agent-computing device may be associated with the customer care agent in the customer care helpdesk of the entity associated with the first service provider 108A. The communication channel may be established over the communication network 110 based on at least the received second input.

In an embodiment, the processor 202 may be further configured to select a multimedia content item based on the received second input for one of the rendered plurality of options corresponding to each of the plurality of levels of the one or more workflows. The multimedia content item may be only selected based on the first and/or the second input provided by the customer, and thus be independent of the profile information and personal details of the customer. Such a way of selection of the multimedia content item protects the privacy of the customer. The selected multimedia content item may be subsequently rendered on a portion of the user interface displayed on the display screen 112 of the customer-computing device 102. Hence, the rendered multimedia content item corresponds to a targeted multimedia content item as the selection is based on based on the first and/or the second input provided by the customer.

Examples of the processor 202 may include, but not limited to, an X86-based processor, a Reduced Instruction Set Computing (RISC) processor, an Application-Specific Integrated Circuit (ASIC) processor, a Complex Instruction Set Computing (CISC) processor, and/or other such processors.

The graphical processor 204 comprises suitable logic, circuitries, interfaces, and/or codes that may be configured to perform one or more operations. In an embodiment, the graphical processor 204 may be configured to render the plurality of options corresponding to each of the plurality of levels of the one or more workflows on the user interface displayed on the display screen 112 of the customer-computing device 102. In an embodiment, the graphical processor 204 may be configured to render the desired service (by the customer), such as account information, on the user interface displayed on a portion of the display screen 112 of the customer-computing device 102. The desired service may be rendered based on the second input for an option corresponding to the desired service.

Examples of the graphical processor 204 may include, but not limited to, an X86-based processor, a Reduced Instruction Set Computing (RISC) processor, an Application-Specific Integrated Circuit (ASIC) processor, a Complex Instruction Set Computing (CISC) processor, an ATI graphics processor, an Nvidia® graphics processor, an AMD Accelerated Processing Unit, an Intel HD graphics processor, and/or other such processors.

The comparator 206 comprises suitable logic, circuitries, interfaces, and/or codes that may be configured to execute the one or more instructions stored in the memory 208. In an embodiment, the comparator 206 may be configured to compare the first input, received from the customer-computing device 102, with the one or more pre-stored datasets in the database 104. Each of the one or more sets of pre-stored data includes a plurality of contact numbers of a plurality of customer care helpdesks of a plurality of entities associated with the registered plurality of service providers 108, such as the first service provider 108A and the second service provider 108B. The comparator 206 may be implemented by use of several technologies that are well known to those skilled in the art.

The memory 208 comprises suitable logic, circuitries, interfaces, and/or codes that may be configured to store the one or more set of instructions, programs, or algorithms, which are executed by the processor 202, the graphical processor 204, and the comparator 206 to perform the one or more predetermined operations. In an embodiment, the memory 208 may temporarily store the data item that includes a plurality of options corresponding to each level of a plurality of levels of the one or more workflows.

In an embodiment, the memory 208 may be configured to store one or more programs, routines, or scripts that may be executed in coordination with the processor 202 and the graphical processor 204. The memory 208 may be implemented based on a Random Access Memory (RAM), a Read-Only Memory (ROM), a Hard Disk Drive (HDD), a storage server, and/or a Secure Digital (SD) card. It will be apparent to a person having ordinary skill in the art that the one or more sets of instructions, codes, scripts, and programs stored in the memory 208 may enable the hardware of the system (application server 106) to perform the one or more predetermined operations.

The transceiver 210 comprises suitable logic, circuitries, interfaces, and/or codes that may be configured to receive or transmit the one or more queries, data, content, or other information to/from one or more computing devices (e.g., the customer-computing device 102) over the communication network 110. The transceiver 210 may implement one or more known technologies to support wired or wireless communication with the communication network 110. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Evolution (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3:
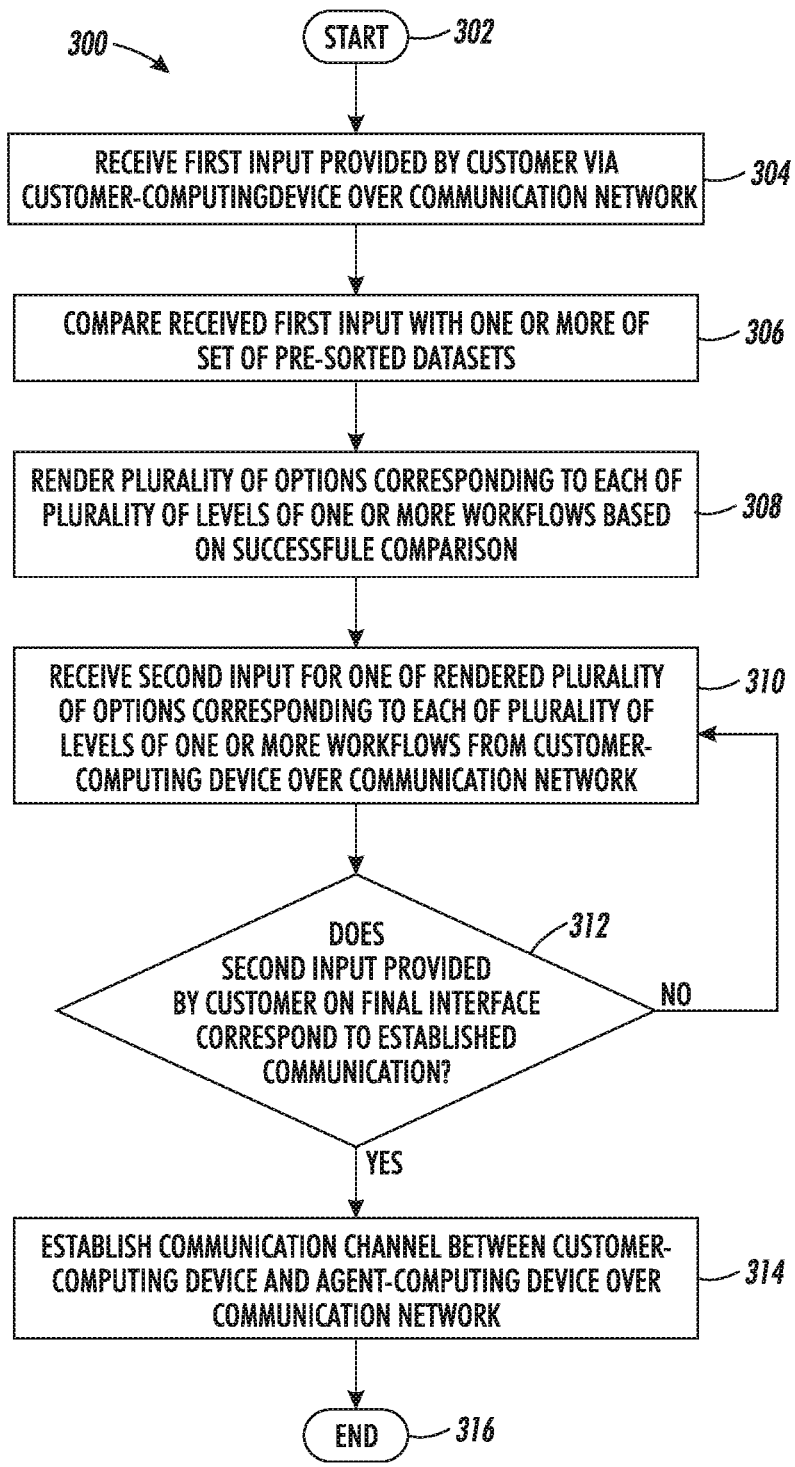
FIG. 3 is a flowchart that illustrates a method for establishing a communication channel between computing devices in a customer care environment, in accordance with at least one embodiment.

FIG. 3 is a flowchart that illustrates a method for establishing a communication channel between computing devices in a customer care environment, in accordance with at least one embodiment. FIG. 3 is described in conjunction with elements from FIG. 1 and FIG. 2. With reference to FIG. 3, there is shown a flowchart 300 that illustrates a method for establishing the communication channel between computing devices in the customer care environment. The method starts at step 302 and proceeds to step 304.

At step 304, the first input, provided by the customer, via the customer-computing device 102 is received, over the communication network 110. In an embodiment, the processor 202 in the application server 106 may be configured to receive the first input from the customer-computing device 102, over the communication network 110. Examples of the customer-computing device 102 may include, but are not limited to, a personal computer, a laptop, a smartphone, a personal digital assistant (PDA), a mobile device, a tablet, or other such computing devices.

In an embodiment, the first input may correspond to the numerical data, such as contact number of a customer care helpdesk of an entity associated with the registered service provider, such as the first service provider 108A. For example, the first input corresponds to a contact number, such as "18001234567," that the customer may dial to connect with a customer care helpdesk of a banking company.

In an embodiment, the customer-computing device 102 may be installed with one or more applications, such as a dialer application. Once the customer provides the first input, the one or more applications may search a local repository to confirm the validity of the first input. The one or more applications may identify that the first input corresponds to the contact number of the customer care helpdesk of the entity associated with the service provider, such as the first service provider 108A.

Prior to receiving the first input from the customer-computing device 102, a web-based application or the software service at the application server 106 may be configured to perform registration of the plurality of service providers 108 associated with the customer care helpdesks of the plurality of entities. The application server 106, via the hosted web-based application or the software service, may communicate with the first service provider 108A and the second service provider 108B over the communication network 110. The application server 106 may receive the contact numbers from the first service provider 108A and the second service provider 108B, respectively, for the registration. Such contact numbers should be supported by the IVRSs of the customer care helpdesks of the plurality of entities.

In an embodiment, the application server 106 may be further configured to receive the one or more workflows from each of the registered plurality of service providers 108 associated with the customer care helpdesks of the plurality of entities. Such one or more workflows received from each of the registered plurality of service providers 108 should be supported by the IVRSs of the customer care helpdesks of the plurality of entities.

In an embodiment, the application server 106 may be further configured to store the plurality of contact numbers and the one or more workflows received from each of the registered plurality of service providers 108 in the database 104. In an embodiment, the application server 106 may be configured to store the plurality of contact numbers and the one or more workflows in a specific data item, such as hash structure or tree structure. The tree structure may further include the plurality of options corresponding to each level of a plurality of levels of the one or more workflows. In Table 1, an exemplary tree structure "TS" has been illustrated for a banking company, corresponding to the contact number "18001234567," as follows:

TABLE 1

TS: Tree Structure for a banking company for contact number "18001234567"

| | | | |
|---|---|---|---|
| | | 1. Savings | Account Information Complaint |
| | Banking | Current | Account Information Complaint |
| English | | Loans | Account Information Complaint |
| | | Shares | Sell |
| | Investment | | Buy |
| | | FDs | Invest Account Information |
| Select Language | | MFs | Invest Account Information |
| | French | | |
| | Italian | | |
| | Spanish | | |
| | Russian | | |

With reference to the illustrated tree structure above, there are shown one or more workflows that refer to a sequence of levels that are traversed to provide the one or more services. For example, one workflow of the banking company may be traversed to provide a service, such as savings account information, to the customer. The workflow may be represented as "Select Language→English→Banking→Savings→Account Information." Another workflow, which may be traversed to provide another service, such as mutual fund account information, to another customer. The workflow may be represented as "Select Language→French→Investment→MFs→Account Information."

Collectively, the tree structure "TS," illustrates multiple workflows. The Level "0" corresponds to the root "Select Language." The Level "1" corresponds to types of languages, such as "English," "French," "Spanish," "Italian," and "Russian." The Level "2" corresponds to the broad categories "Banking" and "Investment." The Level "3" corresponds to granular categories such as "Savings," "Current," "Loans" for "Banking," and "Shares," "FDs," and "MFs" for "Investment." The Level "3" corresponds to more granular categories such as "Account Information" and "Complaint" for "Savings," "Current," and "Loans." Such alternatives at each level of the tree structure, as illustrated in the tree structure "TS," corresponds to graphical items that may be rendered on the user interface of the customer-computing device 102, for a service desired by the customer.

In an embodiment, the web-based application or the software service hosted in the application server 106 may be configured to receive periodic or aperiodic instructions from the plurality of service providers 108 to update the corresponding tree structures. Such updates may be region-based or time-based, as defined by the plurality of service providers 108.

At step 306, the received first input is compared with the one or more pre-stored datasets. In an embodiment, the processor 202, in conjunction with the comparator 206, may be configured to compare the received first input with the one or more pre-stored datasets. The one or more pre-stored datasets may be stored in the local memory, such as the memory 208 or in the remote memory, such as the database 104. The one or more pre-stored datasets includes at least the plurality of contact numbers of the customer care helpdesks of the plurality of entities associated with the plurality of service providers 108. The plurality of contact numbers may include a first contact number and a second contact number provided by the first service provider 108A and the second service provider 108B, respectively. Each of the plurality of contact numbers may be further associated with the one or more workflows, that may be stored in the specific data item, such as the tree structure "TS." For example, the comparator 206 may determine a successful comparison of the first input that corresponds to the contact number "18001234567," with the tree structure "TS" comprising the one or more workflows.

In an embodiment, when the application server 106 and the customer-computing device 102 are different entities, based on the successful comparison, the application server 106 may be configured to transmit the retrieved tree structure "TS" to the customer-computing device 102 over the communication network 110. The customer-computing device 102 may be configured to store the received tree structure "TS" in the local memory. In an embodiment, when the functionality of the application server 106 is implemented in the customer-computing device 102, based on the successful comparison, the retrieved tree structure "TS" is directly saved in the local memory of the customer-computing device 102.

At step 308, the plurality of options corresponding to each of the plurality of levels of the one or more workflows is rendered, based on the successful comparison. In an embodiment, the graphical processor 204 may be configured to render the plurality of options corresponding to each of the plurality of levels of the one or more workflows on the user interface displayed on the display screen 112 of the customer-computing device 102. For example, once the tree structure "TS" is saved in the local memory of the customer-computing device 102, the one or more applications on the customer-computing device 102 may be configured to display a first user interface that includes graphical items, such as buttons, on the display screen 112 of the customer-computing device 102.

At step 310, the second input is received for one of the rendered plurality of options corresponding to each of the plurality of levels of the one or more workflows, from the customer-computing device 102, over the communication network 110. In an embodiment, the processor 202 may receive the second input, provided by the customer, via the customer-computing device 102. The received second input is representative of at least a preference of the customer for a service of the one or more services associated with a workflow of the one or more workflows. The plurality of options is rendered in a sequence defined by the entity. Further, the one or more options corresponding to a level of the one or more workflows are rendered, based on the received second input pertaining to the previous one or more options corresponding to a previous level of the one or more workflows.

For example, the one or more applications on the customer-computing device 102 may determine the first user interface that includes a graphical item, such as a button "SELECT LANGUAGE," displayed on the display screen 112 of the customer-computing device 102. The customer provides the second input to select the graphical item. The graphical item corresponds to the option "Select Language" at the Level "0" of the one or more workflows. Once the second input on the first user interface is received, the one or more applications on the customer-computing device 102 determine a second user interface that includes five graphical items, such as buttons "English," "French," "Spanish," "Italian," and "Russian." The five graphical items correspond to the options at the Level "1" of the one or more workflows. In an embodiment, the five graphical items may be superimposed with other graphical items, such as a dialer pad, displayed by the one or more applications on the display screen 112 of the customer-computing device 102. For example, a graphical button may be common for numeral "1" and the option "English," as shown in FIG. 4B. The customer provides another second input to select the graphical item "English" at the Level "1" of the one or more workflows.

Once the second input on the second user interface is received, the one or more applications on the customer-computing device 102 determine a third user interface that includes two graphical items, such as buttons "Banking" and "Investment". The two graphical items correspond to the options at the Level "2" of the one or more workflows that are based on the selection of the option "English" at the previous Level "1." The customer provides another second input to select the graphical item "Banking" at the Level "2" of the one or more workflows. Once the second input on the third user interface is received, the one or more applications on the customer-computing device 102 determine a fourth user interface that includes three graphical items, such as buttons "Savings," "Current," and "Loans." The three graphical items correspond to the options at the Level "3" of the one or more workflows that are based on the selection of the option "Banking" at the previous Level "2." The customer provides another second input to select the graphical item "Savings" at the Level "2" of the one or more workflows. Once the second input on the fourth user interface is received, the one or more applications on the customer-computing device 102 determine a fifth user interface that includes two graphical items, such as buttons "Account Information" and "Complaints." The two graphical items correspond to the options at the Level "4" of the one or more workflows that are based on the selection of the option "Savings" at the previous third level. The customer provides another second input to select the graphical item "Account Information" at the fourth and final level of the one or more workflows.

In an embodiment, when the second input is provided at the final level of the one or more workflows, the customer-computing device 102 may be configured to display the corresponding service, such as account information, on a portion of the display screen 112 of the customer-computing device 102.

In an embodiment, when the customer is providing the second input for one of the rendered plurality of options corresponding to each of the plurality of levels of the one or more workflows, the processor 202 may be configured to select a multimedia content item. The selected multimedia content item may be associated with the retrieved one or more workflows of the corresponding entity and the received second input at each level. The selected multimedia content item may correspond to advertisements, commercials, promotions, and/or other such multimedia content item.

The processor 202 may be further configured to render the selected multimedia content item on the user interface displayed on the display screen 112 of the customer-computing device 102, on a portion of the display screen 112 of the customer-computing device 102. The selected and rendered multimedia content item may be updated every time the customer provides the second input.

At step 312, it may be determined whether the second input provided by the customer on the final user interface rendered on the display screen 112 of the customer-computing device 102, corresponds to a selection of a graphical button "Call." The second input received to select the graphical button "Call" on the final user interface correspond to an option from the plurality of options associated with the one or more workflows that corresponds to an initiation of communication with the first customer care agent. In an instance, when the customer provides the second input to select the graphical button "Call" on the final user interface, the control passes to step 314. In an instance, when the customer does not provide the second input to select the graphical button "Call" on the final user interface, the control passes back to step 310.

At step 314, when the customer provides the second input to select the graphical button "Call" on the final user interface, the communication channel between the customer-computing device 102 and the agent-computing device is established over the communication network 110. The agent-computing device may be associated with a customer care agent. In an embodiment, the processor 202, in conjunction with the transceiver 210, may be configured to establish the communication channel between the customer-computing device 102 and the agent-computing device. The first agent-computing device may be associated with the first service provider 108A of the plurality of service providers 108. The control passes to end step 316.

FIGS. 4A-4F collectively illustrate an exemplary scenario for establishing a communication channel between computing devices in a customer care environment, in accordance with an embodiment. FIGS. 4A-4F are explained in conjunction with elements from FIGS. 1-3. With reference to FIGS. 4A-4F there is shown the customer-computing device 102, the display screen 112, and a user interface 114. The user interface 114 may be rendered by an application, such as a dialer application, and may include a first section 114A and a second section 114B. The first section 114A may be configured to display the multimedia content item, such as advertisements, and the second section 114B may be configured to display a virtual keypad for receiving the first input and the second input from the customer.

Figure 4A:
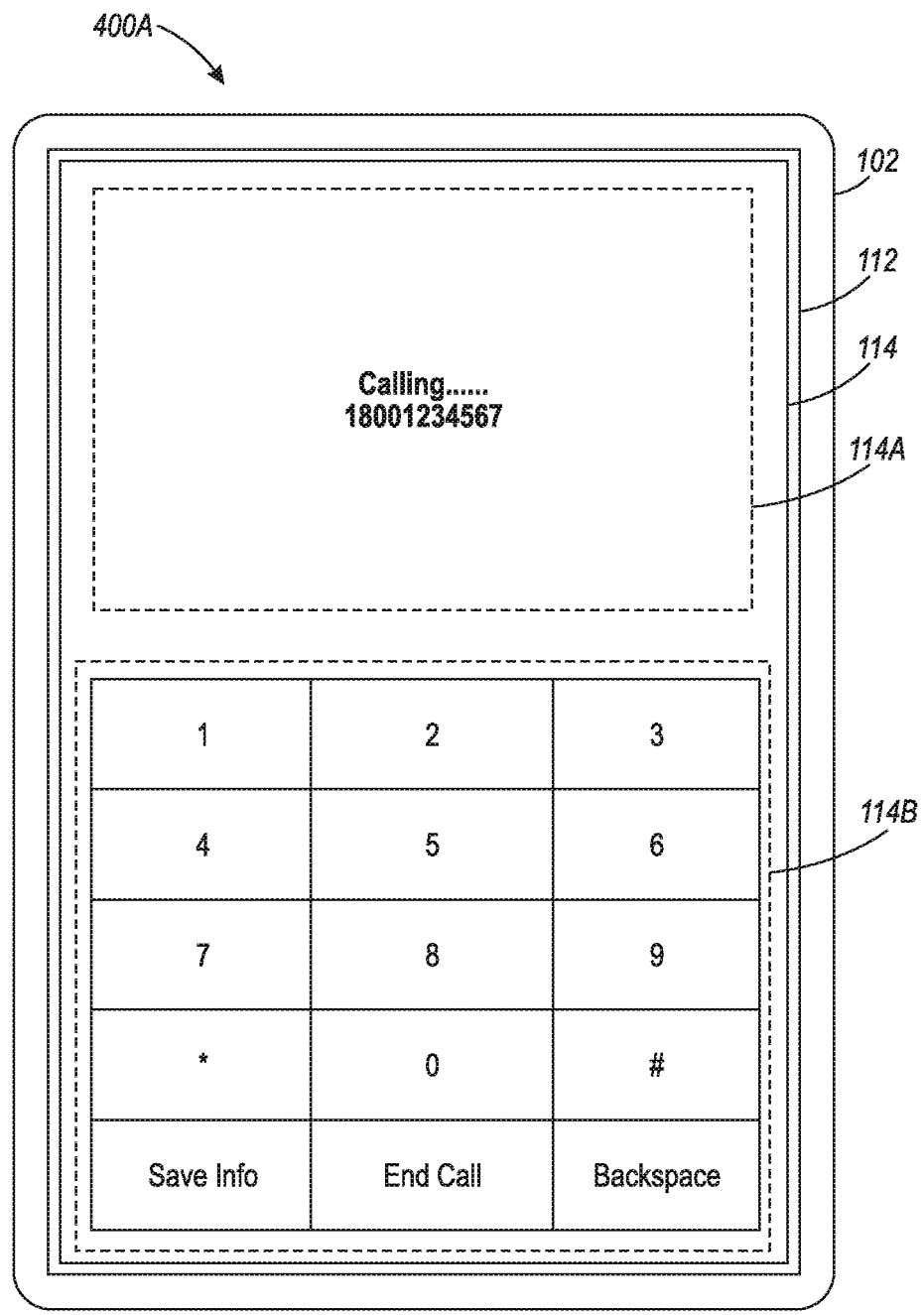
FIGS. 4A-4F collectively illustrate an exemplary scenario for establishing communication channel between computing devices in a customer care environment, in accordance with at least one embodiment.
Figure 4B:
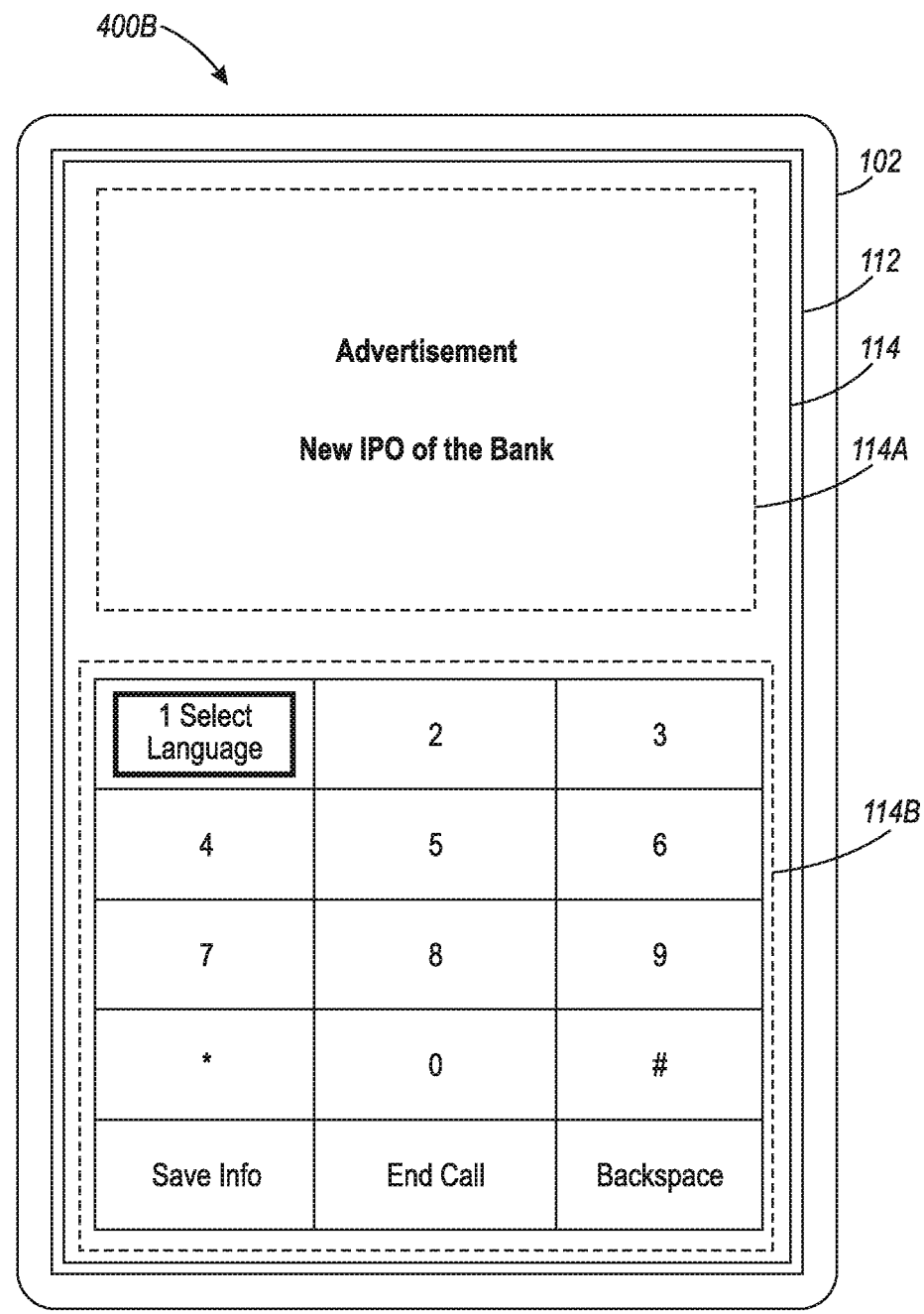

With reference to FIG. 4A, there is shown a first instance 400A of the user interface 114 that is rendered by the dialer application on the display screen 112 of the customer-computing device 102. The customer may desire to seek savings account information, via the customer-computing device 102, from a customer care helpdesk of a banking company associated with a service provider, such as the first service provider 108A. The customer, via the virtual keypad displayed in the second section 114B of the user interface 114, may provide the first input, such as a contact number "18001234567." The dialer application searches the local repository to confirm the validity of the first input. The dialer application identifies that the first input corresponds to the customer care helpdesk of the banking company associated with the first service provider 108A.

Once confirmed, the customer-computing device 102 may be configured to download dataset, such as tree structure "TS" (FIG. 2), which corresponds to the customer care helpdesk of the banking company, from the database 104 via the application server 106. The customer-computing device 102 stores the downloaded tree structure "TS" in the local memory. The tree structure "TS" comprises the one or more workflows in a tree structure. Once the customer-computing device 102 is connected with the IVRS of the customer care helpdesk of the banking company associated with the first service provider 108A, the dialer application modifies the user interface 114, as shown in FIG. 4B.

With reference to FIG. 4B, there is shown a second instance 400B of the user interface 114 that is rendered by the dialer application on the display screen 112 of the customer-computing device 102. The dialer application modifies the second section 114B to include a graphical item, such as a button "SELECT LANGUAGE," displayed on the display screen 112 of the customer-computing device 102. The single option corresponds to Level "0" of the one or more workflows. The customer provides the second input to select the graphical item, such as the button "SELECT LANGUAGE."

The customer-computing device 102 may receive a multimedia content item from the application server 106. The application server 106 may select the multimedia content item based on the first input provided by the customer. For example, the application server 106 may select a new initial public offering of the banking company. The customer-computing device 102 may render the received multimedia content item on the first section 114A in default language, such as "English." The new initial public offering of the banking company may be pre-configured in the application server 106 by the entity, i.e., the banking company, via a web interface. Once the second input is received from the customer, the dialer application further modifies the user interface 114, as shown in FIG. 4C.

Figure 4C:
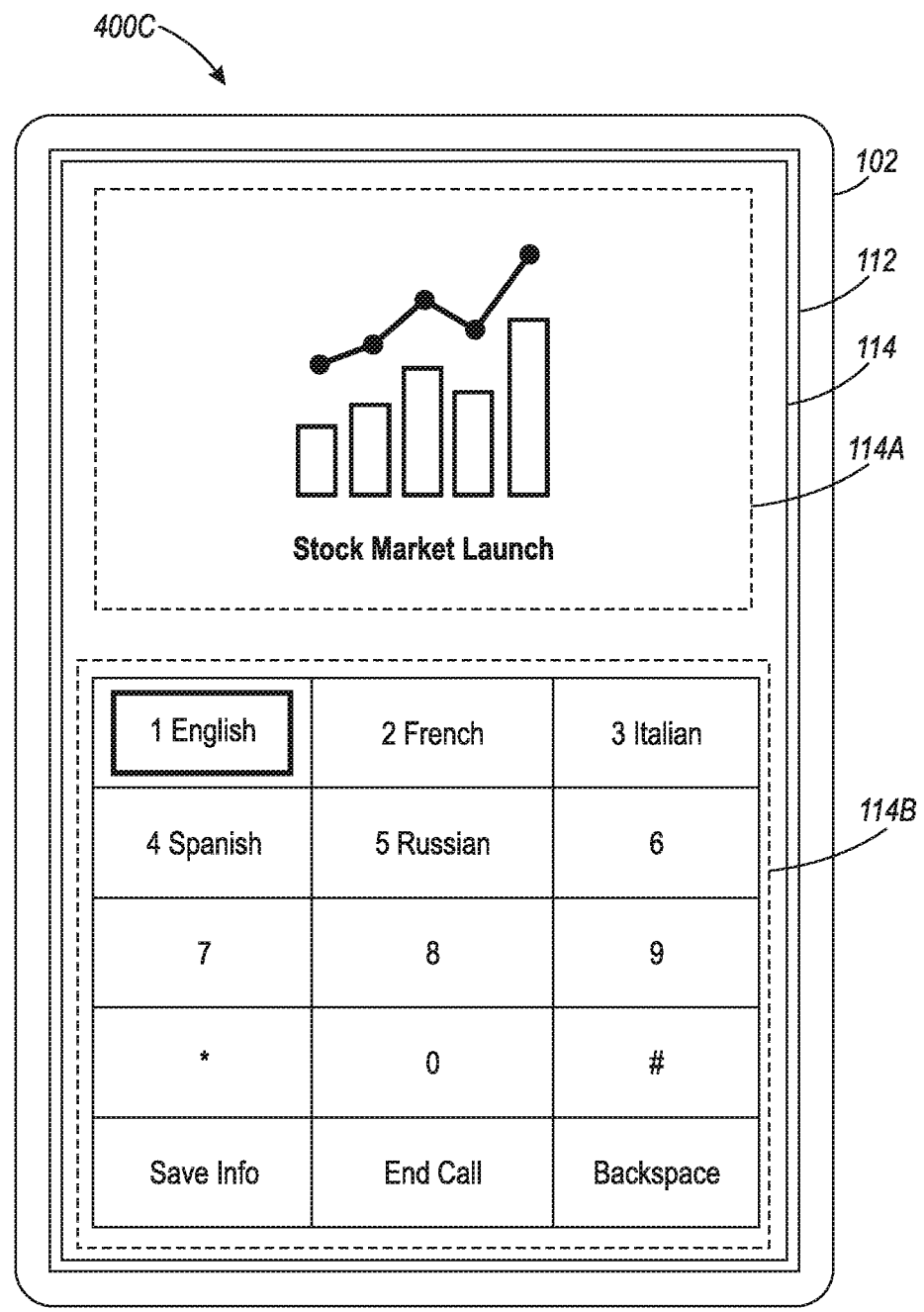

With reference to FIG. 4C, there is shown a third instance 400C of the user interface 114 that is rendered by the dialer application on the display screen 112 of the customer-computing device 102. The dialer application modifies the second section 114B to include five graphical items, such as buttons "English," "French," "Spanish," "Italian," and "Russian." The five graphical items correspond to the options at the Level "1" of the one or more workflows. For example, a graphical button may be common for numeral "1" and option "English", as shown in FIG. 4C. The customer provides another second input to select the graphical item "English" at the Level "1" of the one or more workflows.

The customer-computing device 102 may further receive multimedia content item from the application server 106. The application server 106 may select the multimedia content item based on the first input and the second input provided by the customer. For example, the application server 106 may select stock market launch of the banking company. The customer-computing device 102 may render the received multimedia content item, i.e., the stock market launch, on the first section 114A in selected language, "English." The stock market launch of the banking company may be pre-configured in the application server 106 by the entity, i.e., the banking company, via a web interface. Once the second input is received from the customer, the dialer application further modifies the user interface 114, as shown in FIG. 4D.

Figure 4D:
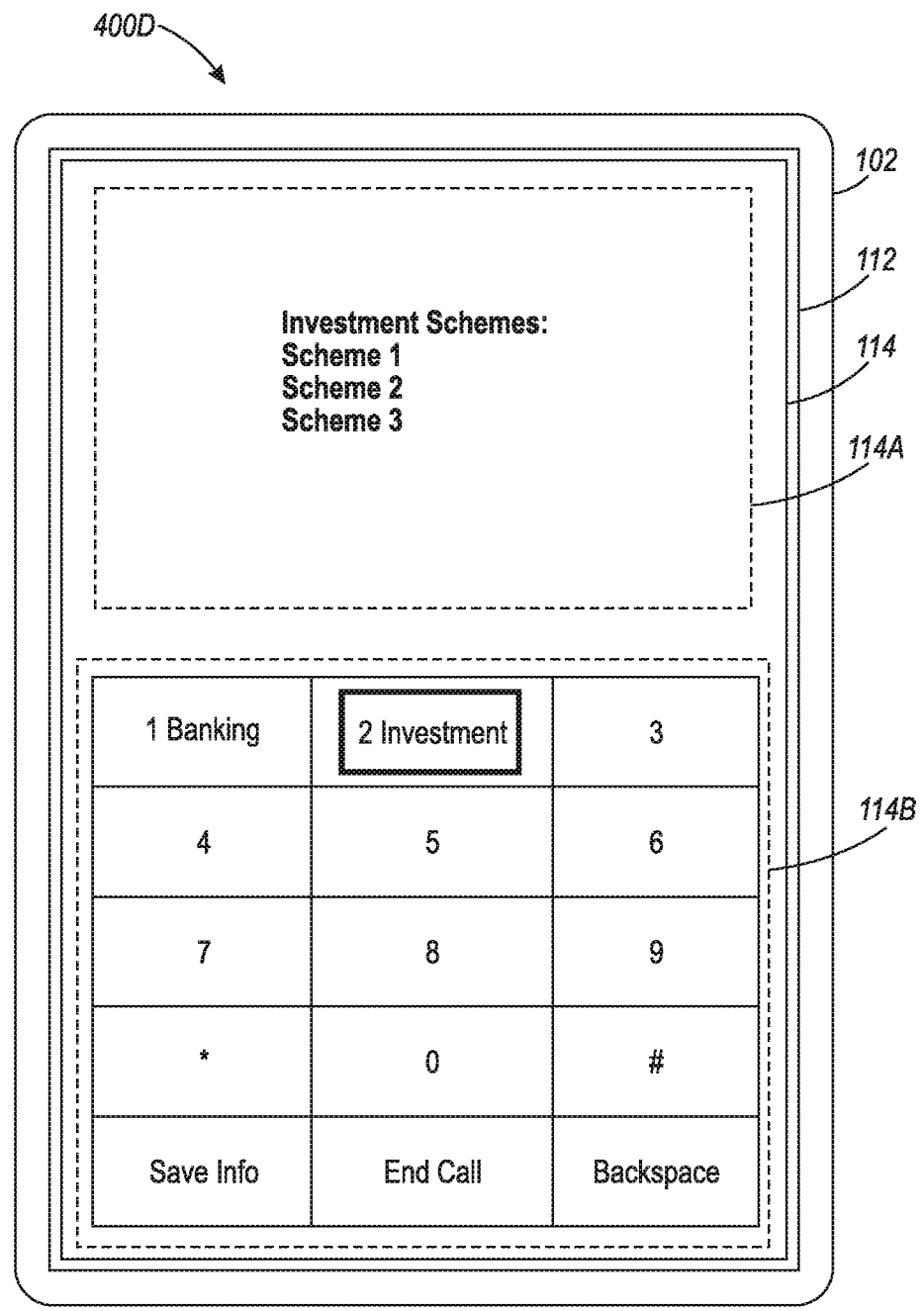

With reference to FIG. 4D, there is shown a fourth instance 400D of the user interface 114 that is rendered by the dialer application on the display screen 112 of the customer-computing device 102. The dialer application modifies the second section 114B to include two graphical items, such as buttons "Banking" and "Investment." The two graphical items correspond to the options at the Level "2" of the one or more workflows. For example, a graphical button may be common for numeral "2" and option "Investment," as shown in FIG. 4D. The customer provides another second input to select the graphical item "Investment" at the Level "2" of the one or more workflows.

The customer-computing device 102 may further receive multimedia content item from the application server 106. The application server 106 may select the multimedia content item based on the first input and the second input provided by the customer. For example, the application server 106 may select investment schemes offered by the banking company. The customer-computing device 102 may render the received multimedia content item, i.e., the investment schemes, on the first section 114A in selected language, "English." Such investment schemes of the banking company may be pre-configured in the application server 106 by the entity, i.e., the banking company, via a web interface. Once the second input is received from the customer, the dialer application further modifies the user interface 114, as shown in FIG. 4E.

Figure 4E:
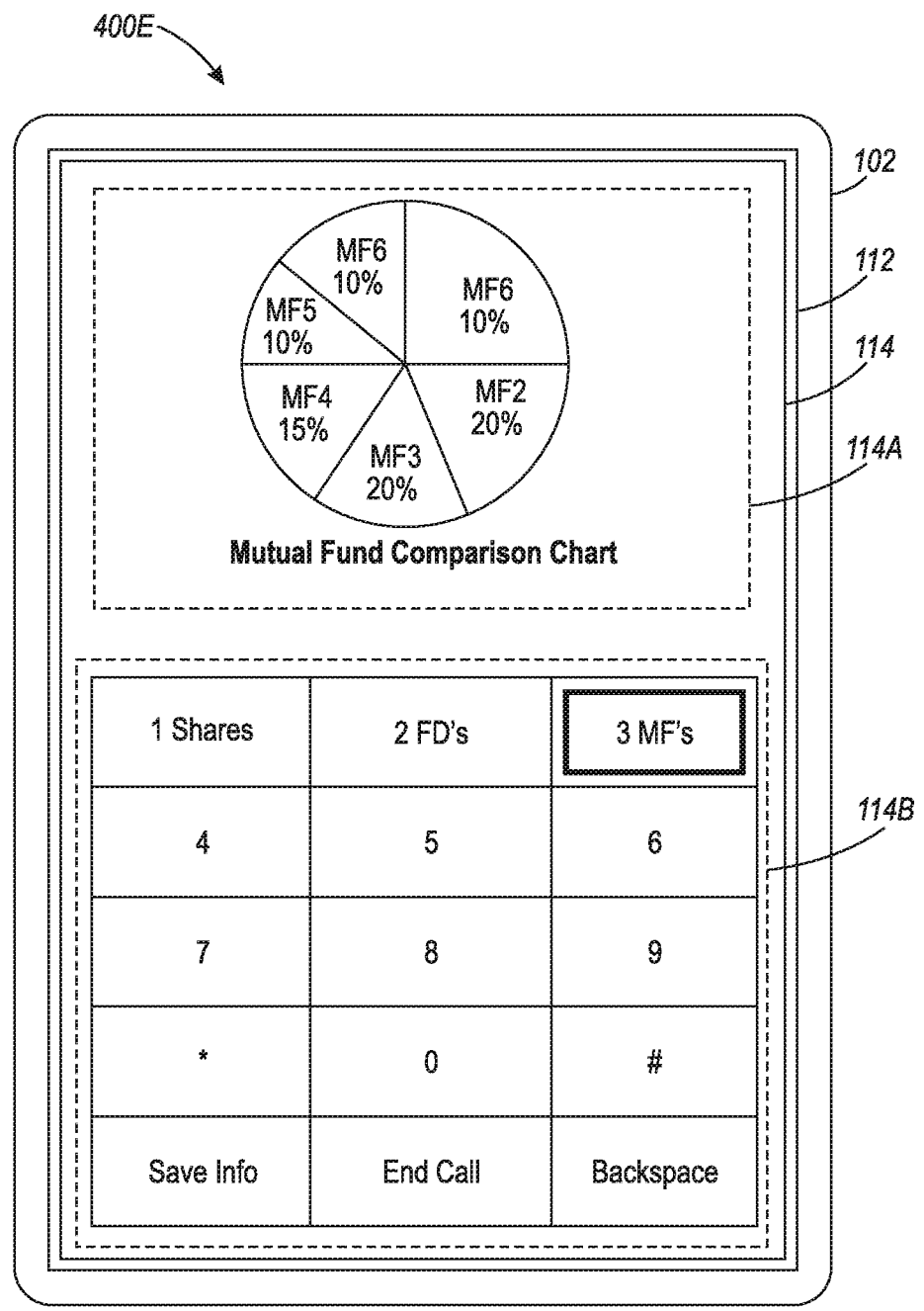

With reference to FIG. 4E, there is shown a fifth instance 400E of the user interface 114 that is rendered by the dialer application on the display screen 112 of the customer-computing device 102. The dialer application modifies the second section 114B to include three graphical items, such as buttons "Shares," "FDs," and "MFs." The three graphical items correspond to the options at the Level "3" of the one or more workflows. For example, a graphical button may be common for numeral "3" and option "MFs," as shown in FIG. 4E. The customer provides another second input to select the graphical item "MFs" at the Level "3" of the one or more workflows.

The customer-computing device 102 may further receive multimedia content item from the application server 106. The application server 106 may select the multimedia content item based on the first input and the second input provided by the customer. For example, the application server 106 may select comparative analysis of mutual fund schemes offered by the banking company with respect to other agencies. The customer-computing device 102 may render the received multimedia content item on the first section 114A in selected language, "English." The received multimedia content item of the banking company may be pre-configured in the application server 106 by the entity, i.e., the banking company, via a web interface. Once the second input is received from the customer, the dialer application further modifies the user interface 114, as shown in FIG. 4F.

Figure 4F:
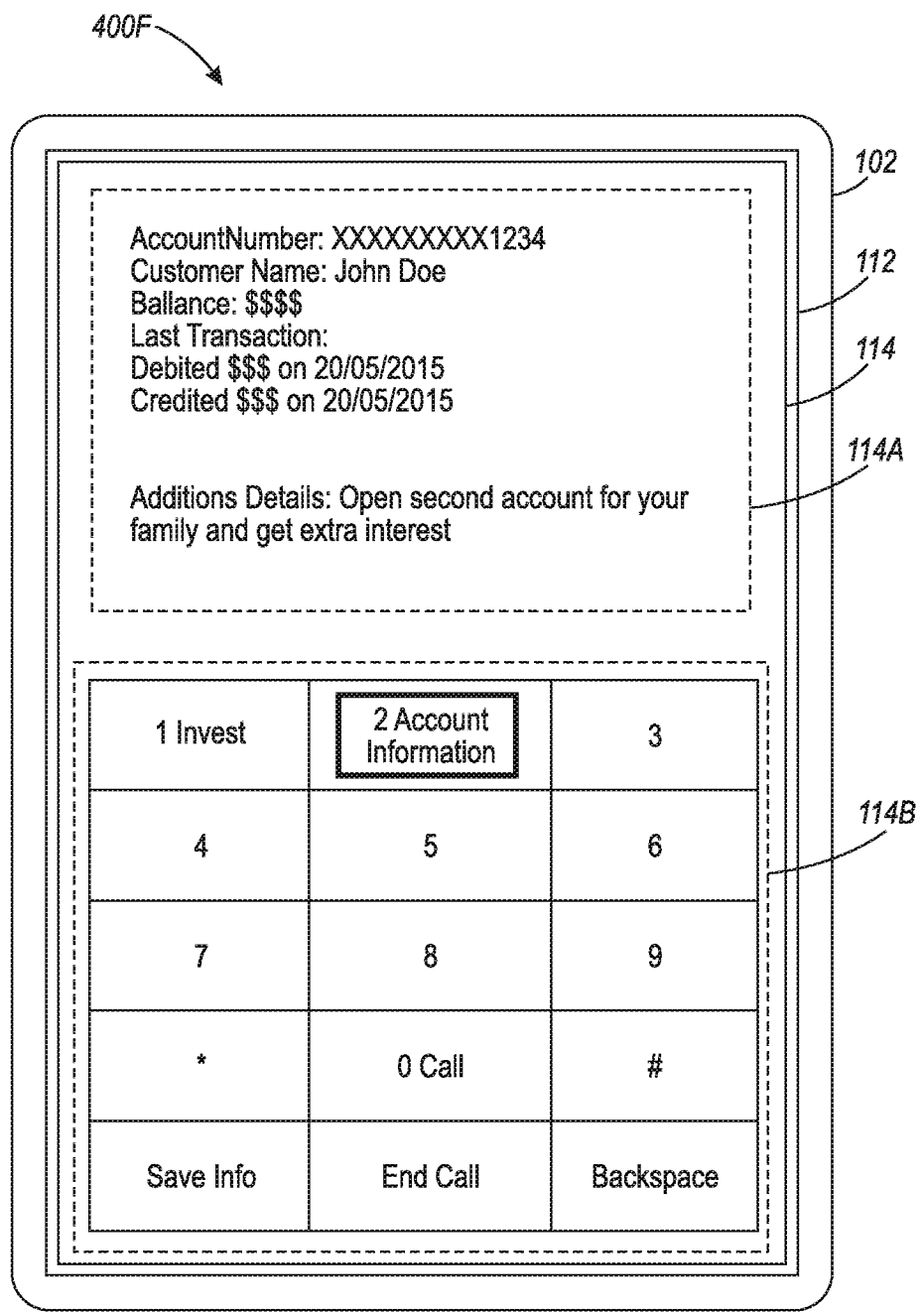

With reference to FIG. 4F, there is shown a sixth instance 400F of the user interface 114 that is rendered by the dialer application on the display screen 112 of the customer-computing device 102. The dialer application modifies the second section 114B to include two graphical items, such as buttons "Invest" and "Account Information." The two graphical items correspond to the options at the final Level "4" of the one or more workflows. For example, a graphical button may be common for numeral "2" and option "Account Information," as shown in FIG. 4F. The customer provides another second input to select the graphical item "Account Information" at the Level "4" of the one or more workflows.

The customer-computing device 102 may receive account information from the banking company via the application server 106. In an embodiment, the customer may have to provide pre-set credentials to receive the account information. In certain cases, the identity of the customer may be verified via biometric information, such as fingerprints, of the customer. The customer may further perform pre-specified operations, such as pinch-out operation, to zoom out the multimedia content item rendered in the first section 114A and/or the virtual keypad displayed in the second section 114B of the user interface 114. The customer may also listen to the IVRS along with the received account information. At the final level, such as Level "4," the second section 114B may further display an option "Call" to establish a connection between the customer-computing device 102 and an agent-computing device of the customer care helpdesk of the banking company associated with the first service provider 108A. In an embodiment, the customer-computing device 102 may be further configured to store the transaction log, i.e. the received account information, in the local memory.

The disclosed embodiments encompass numerous advantages. The disclosure provides a method for establishing communication channel between computing devices in a customer care environment. The disclosed system facilitates one or more customers to select one or more options via a visual keypad of a customer-computing device to avail one or more services. The disclosed system may be quite useful for customers who unable to listen to the voice response of the IVRS system due to various factors, such as ambient noise or hearing disablement. Such customers may conveniently select one or more options from the visual keypad displayed on the display screen of the customer-computing device. The disclosed system also enables the customers to magnify a portion of the display screen to understand and select the displayed one or more options. This may be quiet useful for customers unable to view the display screen due to various factors, such as ambient light or partial visual disablement.

The disclosed system may optimally manage load in the customer care computing systems by reducing call costs as the waiting time of the calling customers is decreased. The disclosed system may target the customers with additional advertisements that may be pertinent to what the customers are looking for without invading their privacy. The customers may be targeted for privacy aware mobile marketing (PAMM) through customer mobile services (CMS). The disclosed system further generates additional revenue by providing targeted advertisements to the users. The disclosed system further reduces call time as the transaction information is locally available in the customer-computing device along with listening to the voice via IVRS.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for establishing a communication channel between computing devices in a customer care environment are disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for establishing a communication channel between computing devices in a customer care environment, the method comprising:
    receiving, by one or more transceivers at an application server hosting an application, a contact number from a customer-computing device executing the application, the customer-computing device associated with a customer, wherein the contact number corresponds to a first entity;
    comparing, by one or more comparators at the application server, the received contact number with one or more pre-stored datasets, wherein the one or more pre-stored datasets include at least a plurality of contact numbers associated with a plurality of entities, the plurality of entities including the first entity, wherein each of the plurality of contact numbers is further associated with a one or more workflows;
    determining, based on the comparison at the application server, that the contact number is associated with the first entity from among the plurality of entities;
    retrieving, from a database coupled to the application server, a first workflow from the one or more workflows, wherein the first workflow is provided to the application server by the first entity;
    rendering, by one or more processors at the application server, a plurality of options corresponding to each of a plurality of levels of the first workflow associated with the first entity on a user interface displayed on a display screen of the customer-computing device;
    receiving, by the one or more transceivers at the application server, a preference of the customer for one option of the rendered plurality of options from the customer-computing device, wherein the received preference is representative of a service of one or more services associated with the first workflow; and
    establishing, by the one or more processors at the application server, the communication channel between the customer-computing device and an agent-computing device associated with the first entity based on at least the received preference.

2. The method of claim 1, wherein the plurality of options corresponding to each of the plurality of levels of the first workflow are rendered in a sequence defined by the first entity, wherein rendering of one or more options corresponding to a level of the one or more workflows is based on the received preference pertaining to one or more previous options corresponding to a previous level of the first workflow.

3. The method of claim 1, wherein the communication channel is established between the customer-computing device and the agent-computing device when the received preference is representative of at least a selection of the one option that corresponds to an initiation of the communication channel.

4. The method of claim 1 further comprising selecting, by the one or more processors, multimedia content item associated with the first entity from a set of multimedia content items associated with the plurality of entities, based on the received preference.

5. The method of claim 4 further comprising rendering, by the one or more processors, the selected multimedia content item on the user interface based on the service associated with the first workflow.

6. The method of claim 1 further comprising storing, by the one or more processors, the one or more workflows associated with the contact number in a local memory of the customer-computing device.

7. The method of claim 1 further comprising connecting, by the one or more processors, with an interactive voice response system associated with the first entity for the rendering of the plurality of options.

8. A system for establishing a communication channel between computing devices in a customer care environment, the system comprising:
    an application server configured to host an application that is executed on a customer-computing device; and
    one or more processors coupled to the application server, the one or more processors being configured to:
    receive a contact number from the customer-computing device, the customer-computing device associated with a customer, wherein the contact number corresponds to a first entity;
    compare the received contact number with one or more pre-stored datasets, wherein the one or more pre-stored datasets include at least a plurality of contact numbers associated with a plurality of entities, the plurality of entities including the first entity, wherein each of the plurality of contact numbers is further associated with one or more workflows;
    determine, based on the comparison, that the contact number is associated with the first entity from among the plurality of entities;
    retrieve, from a database coupled to the application server, a first workflow from the one or more workflows, wherein the first workflow is provided to the application server by the first entity;
    render a plurality of options corresponding to each of a plurality of levels of the first workflow associated with the first entity on a user interface displayed on a display screen of the customer-computing device;
    receive a preference of the customer for one option of the rendered plurality of options from the customer-computing device, wherein the received preference is representative of a service of one or more services associated with the first workflow; and
    establish a communication channel between the customer-computing device and an agent-computing device associated with the first entity based on at least the received preference.

9. The system of claim 8, wherein the plurality of options corresponding to each of the plurality of levels of the first workflow are rendered in a sequence defined by the first entity, wherein rendering of one or more options corresponding to a level of the one or more workflows is based on the received preference pertaining to one or more previous options corresponding to a previous level of the first workflow.

10. The system of claim 8, wherein the communication channel is established between the customer-computing device and the agent-computing device when the received preference is representative of at least a selection of the one option that corresponds to an initiation of the communication channel.

11. The system of claim 8, wherein the one or more processors are configured to select multimedia content item associated with the entity from a set of multimedia content items associated with the plurality of entities, based on the received preference.

12. The system of claim 11, wherein the one or more processors are configured to render the selected multimedia content item on the user interface based on the service associated with the first workflow.

13. The system of claim 8, wherein the one or more processors are configured to store the one or more workflows associated with the contact number in a local memory of the customer-computing device.

14. The system of claim 8, wherein the one or more processors are configured to connect with an interactive voice response system associated with the first entity for the rendering of the plurality of options.

15. A computer program product for use with an application server, the computer program product comprising a non-transitory computer readable medium, wherein the non-transitory computer readable medium stores a computer program code for establishing a communication channel between computing devices in a customer care environment, wherein the computer program code is executable by one or more processors in the application server to:
  receive a contact number from a customer-computing device executing an application hosted by the application server, the customer-computing device being associated with a customer, wherein the contact number corresponds to a first entity;
  compare the received contact number with one or more pre-stored datasets, wherein the one or more pre-stored datasets include at least a plurality of contact numbers associated with a plurality of entities, the plurality of entities including the first entity, wherein each of the plurality of contact numbers is further associated with one or more workflows;
  determine, based on the comparison, that the contact number is associated with the first entity from among the plurality of entities;
  retrieve, from a database coupled to the application server, a first workflow from the one or more workflows, wherein the first workflow is provided to the application server by the first entity;
  render a plurality of options corresponding to each of a plurality of levels of the first workflow associated with the first entity on a user interface displayed on a display screen of the customer-computing device;
  receive a preference of the customer for one option of the rendered plurality of options from the customer-computing device, wherein the received preference is representative of a service of one or more services associated with the first workflow; and
  establish a communication channel between the customer-computing device and an agent-computing device associated with the first entity based on at least the received preference.

* * * * *